US012403622B2

(12) United States Patent
Widder

(10) Patent No.: US 12,403,622 B2
(45) Date of Patent: Sep. 2, 2025

(54) CORDLESS DRILL POWERED LOG SPLITTER

(71) Applicant: Ardisam, Inc., Cumberland, WI (US)

(72) Inventor: Kevin Widder, Plymouth, WI (US)

(73) Assignee: ARDISAM, INC., Cumberland, WI (US)

( * ) Notice: Subject to any disclaimer, the term of this patent is extended or adjusted under 35 U.S.C. 154(b) by 165 days.

(21) Appl. No.: 18/193,496

(22) Filed: Mar. 30, 2023

(65) Prior Publication Data

US 2024/0326284 A1 Oct. 3, 2024

(51) Int. Cl.
*B27L 7/06* (2006.01)

(52) U.S. Cl.
CPC ...................................... *B27L 7/06* (2013.01)

(58) Field of Classification Search
CPC ................. B27L 7/00; B27L 7/06; B27L 7/08
See application file for complete search history.

(56) References Cited

U.S. PATENT DOCUMENTS 4,121,636 A * 10/1978 James ................. B27B 17/0016 144/195.5
4,192,364 A 3/1980 Findley
4,423,759 A 1/1984 Seeger
4,463,787 A * 8/1984 Lenertz ..................... B27L 7/00 144/366
7,198,081 B2 4/2007 Lewis et al.
7,640,955 B2 * 1/2010 Tischer ................... B27L 7/005 144/195.8
7,814,945 B2 10/2010 Babcock
10,800,068 B2 10/2020 Prentiss
2006/0060262 A1 3/2006 Hicks
2011/0041955 A1 2/2011 Bedel
2012/0255650 A1 * 10/2012 Fields .................... B27G 21/00 144/366
2016/0303760 A1 10/2016 Manchik

FOREIGN PATENT DOCUMENTS

DE 102016123602 A1 6/2018
EP 3326770 A1 5/2018

* cited by examiner

*Primary Examiner* — Matthew Katcoff
(74) *Attorney, Agent, or Firm* — PERKINS COIE LLP

(57) ABSTRACT

A cordless drill powered log splitter. The cordless drill powered log splitter includes a body and one or more rails, the one or more rails configured to support a piece of wood during a splitting operation. The cordless drill powered log splitter also includes a splitting wedge mounted on the body and a contact member, the contact member configured to press the piece of wood against the splitting wedge during the splitting operation. The cordless drill powered log splitter further includes a transmission, the transmission configured to move the contact member relative to the body and connect to a cordless drill, where the cordless drill provides the power to the transmission.

20 Claims, 12 Drawing Sheets

CORDLESS DRILL POWERED LOG SPLITTER

CROSS-REFERENCE TO RELATED APPLICATIONS

Not applicable.

BACKGROUND OF THE INVENTION

A log splitter is a piece of machinery or equipment used for splitting firewood from softwood or hardwood logs. There are also manual log splitters, which use mechanical leverage to force logs through a sharpened blade assembly; and screw or 'corkscrew' types that are driven directly from an agricultural tractor's power take-off shaft where the splitter is mounted on the three-point hitch.

Log splitter are generally powered in one of two ways, they are either connected to a power source via an electric cord which powers an electric motor driving a hydraulic pump or by gasoline or diesel engine with or without a tractor. The non-electric versions are intended to be used remotely where the splitter can be moved to the location of the cut wood source. The problem with gas or diesel powered log splitters, however, is that they weigh more than electric log splitters. This is partly due to their more complex engines and partly due to the fact that they have a liquid fuel which must also be transported. Thus, an operator in a remote location must choose between weight and available power sources.

To handle this tradeoff, some operators use an electric log splitter which is powered by a generator or which is plugged into a car or other power source. Overall the weight is greater, but the actual log splitter itself is a lighter version. While this is less efficient, it means that a lighter log splitter can be used in more remote locations.

Therefore, there is a need in the market for a log splitter which is as light as possible, to increase portability but has power sources which are portable as well.

SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a cordless drill powered log splitter. The cordless drill powered log splitter includes a body and one or more rails, the one or more rails configured to support a piece of wood during a splitting operation. The cordless drill powered log splitter also includes a splitting wedge mounted on the body and a contact member, the contact member configured to press the piece of wood against the splitting wedge during the splitting operation. The cordless drill powered log splitter further includes a transmission, the transmission configured to move the contact member relative to the body and connect to a cordless drill, where the cordless drill provides the power to the transmission.

Another example embodiment includes a cordless drill powered log splitter. The cordless drill powered log splitter includes a body and one or more rails, the one or more rails configured to support a piece of wood during a splitting operation. The cordless drill powered log splitter also includes a splitting wedge mounted on the body and a contact member, the contact member configured to press the piece of wood against the splitting wedge during the splitting operation. The cordless drill powered log splitter further includes a transmission, the transmission configured to move the contact member relative to the body and connect to a cordless drill, where the cordless drill provides the power to the transmission. The cordless drill powered log splitter further includes a faceplate, where the faceplate seals the transmission and a shaft, where the shaft passes through the faceplate and is configured to connect to a cordless drill. The cordless drill powered log splitter additionally includes a foot, where the foot is configured to support the cordless drill during operation.

Another example embodiment includes a cordless drill powered log splitter. The cordless drill powered log splitter includes a body and one or more rails, the one or more rails configured to support a piece of wood during a splitting operation. The cordless drill powered log splitter also includes a splitting wedge mounted on the body and a contact member, the contact member configured to press the piece of wood against the splitting wedge during the splitting operation. The cordless drill powered log splitter further includes a frame, where the frame is configured to connect the contact member to the body and a guide assembly. The guide assembly includes a cylinder, the cylinder disposed at least partially within the body and a c-bracket, the c-bracket connect to the cylinder. The guide assembly additionally includes one or more rods, where the one or more rods are connected to the c-bracket at a first end and connected to the frame at a second end. The cordless drill powered log splitter moreover includes a transmission, the transmission configured to move the cylinder relative to the body and a faceplate, where the faceplate seals the transmission. The cordless drill powered log splitter also includes a shaft, where the shaft passes through the faceplate and is configured to connect to a cordless drill. The cordless drill powered log splitter further includes a foot, where the foot is configured to support the cordless drill during operation a switch, where the switch must be actuated in order for the contact member to move relative to the body. The cordless drill powered log splitter additionally includes a stop, where the stop allows the user to set the initial distance between the contact member and the splitting wedge and a return, where the return automatically returns the contact member to its original position after the splitting operation.

These and other objects and features of the present invention will become more fully apparent from the following description and appended claims, or may be learned by the practice of the invention as set forth hereinafter.

BRIEF DESCRIPTION OF DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE INVENTION

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
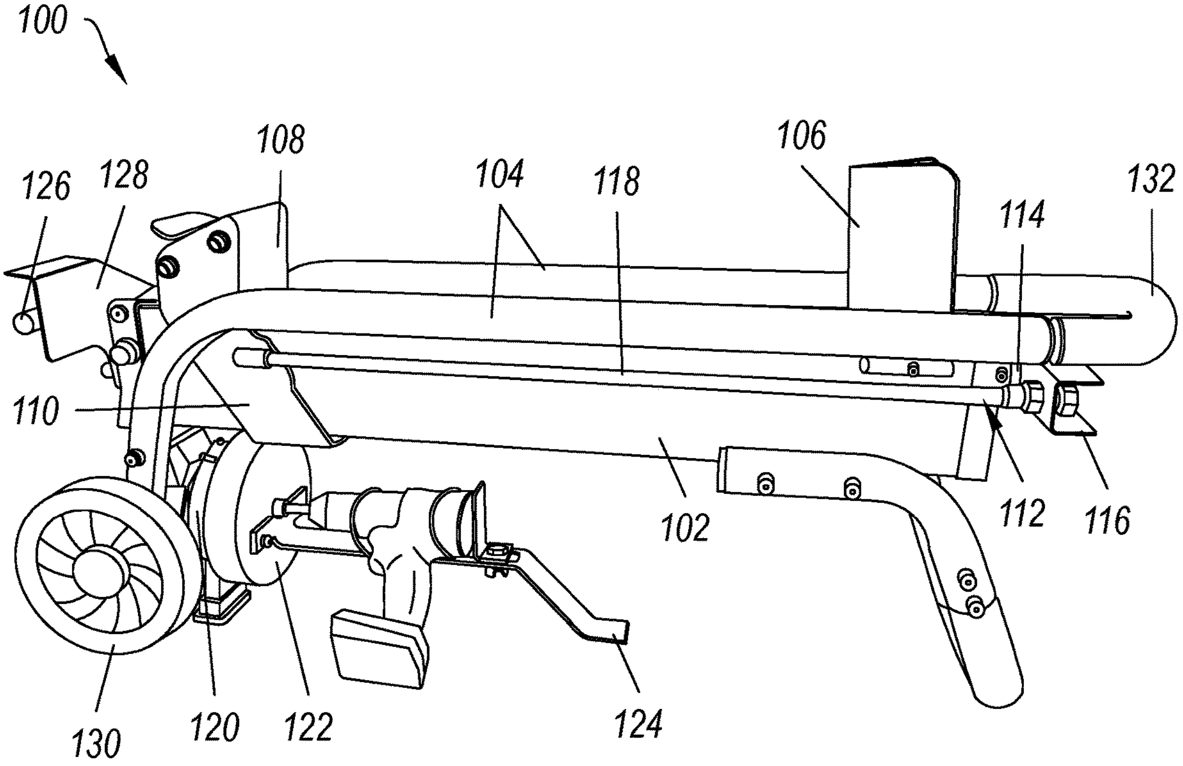
FIG. 1 illustrates a perspective view of the cordless drill powered log splitter.

FIG. 1 illustrates a perspective view of the cordless drill powered log splitter 100. The cordless drill powered log splitter 100 is designed to replace gas-powered and electrically powered log splitters which are harmful for the environment and more complicated for use. Further, the cordless drill powered log splitter 100 obviates the necessity of having to deal with electrical cords or lower power performance during operation of splitting a log.

Experimentation has shown that the cordless drill powered log splitter 100 has a number of advantages over existing log splitters. For example, the cordless drill powered log splitter 100 can produce ¾ of a cord of wood in a single hour, which is comparable to other log splitters. The cord is a unit of measure of dry volume used to measure firewood and pulpwood in the United States and Canada. A cord is the amount of wood that, when "racked and well stowed" (arranged so pieces are aligned, parallel, touching and compact), occupies a volume of 128 cubic feet (3.62 $m^3$). This corresponds to a well-stacked woodpile 4 feet (122 cm) high, 8 feet (244 cm) wide, and 4 feet (122 cm) deep; or any other arrangement of linear measurements that yields the same volume.

However, the weight of the cordless drill powered log splitter 100 is significantly lower than existing log splitters. For example, the cordless drill powered log splitter 100 is approximately 70 pounds, versus 88 pounds for an electric log splitter and 235 pounds for a gas-powered electric log splitter. This reduction in weight is due to a number of factors, which are described below. The lower weight increases portability and maneuverability.

FIG. 1 shows that the cordless drill powered log splitter 100 can include a body 102. The body 102 provides durability to the cordless drill powered log splitter 100 for handling large and bulky logs and firewood. Likewise, the body 102 holds the other portions of the cordless drill powered log splitter 100 to ensure the proper configuration of all components. The body 102 can be created from any desired material, such as aluminum, steel, cast iron or polymers. The body 102 can be a hollow rectangular cylinder, allowing other portions of the cordless drill powered log splitter 100 to be placed therein, as described below.

FIG. 1 also shows that the body 102 can include rails 104. The rails 104 run from the front of the body 102 to the rear of the body 102. Further, the rails 104 are configured to support the log during a splitting operation and to provide a guide for the log to move during a splitting operation. The body 102 can be a third support for the wood to be split or the rails 104 can elevate the wood away from the body 102. I.e., the rails 104 can provide a "track" for the wood during splitting which is elevated from the body 102. Because of this, the rails 104 should be strong yet low friction, such as tubular steel (hollow steel tubes), aluminum, or other materials. Tubular steel provides rails 104 that are strong but lighter than solid steel. In addition, coatings can be present which decrease the friction on the rails 104. For example, coatings can be polymers, paint, silicones, lubricants or any other desired coating. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

An additional benefit of the rails 104 is that they form a framework to increase the stability and portability of the cordless drill powered log splitter 100. In particular, the rails 104 can be used by a user to pick up the cordless drill powered log splitter 100. Because the cordless drill powered log splitter 100 is lighter than other log splitters, it can easily be lifted by the rails 104 by a single user. In addition, the rails 104 form a scaffold or skeleton which is rigid enough that it can strengthen the cordless drill powered log splitter 100.

FIG. 1 additionally shows that the cordless drill powered log splitter 100 can include a splitting wedge 106. The splitting wedge 106 is securely attached to the body 102. The splitting wedge 106 is a triangular-shaped member having a vertical edge directed toward the longitudinal direction of the body 102 such that the vertical edge is configured to contact and cut a log. The splitting wedge 106 has a pair of side pieces that extend from the vertical edge and form an angle therebetween. The angle formed between the side pieces can vary. The preferred angle formed by the side pieces is between about thirty and fifty-five degrees (30°-55°). Because the splitting wedge 106 is subject to large forces, it should be made of durable materials such as steel, cast iron, aluminum, or polymers.

FIG. 1 moreover shows that the cordless drill powered log splitter 100 can include a contact member 108. The contact member 108 can include a plate that is configured to press on the log. That is, the contact member 108 is configured to move, putting force on the log, pressing the log onto the splitting wedge 106. I.e., the contact member 108 presses the log onto the splitting wedge 106 with enough force that the log is split by the splitting wedge 106. Thus, the contact member 108 needs to be sturdy enough that the resistant forces of the log don't cause damage to the contact member 108.

FIG. 1 also shows that the contact member 108 can include a frame 110. The frame 110 is placed around the body 102, ensuring that the contact member 108 can move longitudinally relative to the body 102, but does not separate from the body 102. Wheels or bearings can be placed between the frame 110 and the body 102 to allow the frame 110 to move longitudinally relative to the body 102. A bearing is a machine element that constrains relative motion to only the desired motion, and reduces friction between moving parts. Therefore, bearings allow the frame 110 to move longitudinally relative to the body 102 while remaining aligned axially with the body 102.

FIG. 1 also shows that the cordless drill powered log splitter 100 can include a guide assembly 112. The guide assembly 112 is configured to actuate the contact member 108 toward and away from the stationary splitting wedge 106 in a translational manner by way of reciprocal movement relative to the longitudinal direction of the body 102 and the rails 104. I.e., the guide assembly 112 moves the contact member 108 relative to the body 102. That is, the guide assembly 112 provides the force for the contact member 108 to drive the log onto the splitting wedge 106, splitting the wood.

FIG. 1 further shows that the guide assembly 112 can include a cylinder 114. The cylinder 114 is disposed within the body 102 and is configured to extend and retract actuating the contact member 108 toward and away from the splitting wedge 106. The movement of the cylinder 114 can be by any desired actuating means. For example, the cylinder 114 can be moved by a hydraulic system, compressed air, a screw drive or any other desired drive system.

FIG. 1 additionally shows that the guide assembly 112 can include a c-bracket 116. The c-bracket 116 is connected to the cylinder 114. When the cylinder 114 is actuated such that the cylinder 114 extends from the body 102, the c-bracket 116 is driven away from the body 102 and when the cylinder 114 is actuated such that cylinder 114 retracts into the body 102, the c-bracket 116 is pulled toward the body 102.

FIG. 1 moreover shows that the guide assembly 112 can include rods 118. The rods 118 are connected to the c-bracket 116 and the contact member 108 or frame 110. The rods 118 are parallel to the body 102 and the rails 104. Any movement of the cylinder 114 is transmitted through the c-bracket 116 and the rods 118 to the contact member 108 (directly or through the frame 110) driving the contact member 108 toward the splitting wedge 106 or away from the splitting wedge 106. This allows a tremendous amount of force to be applied to the contact member 108 as needed to drive the log onto the splitting wedge 106.

FIG. 1 also shows that the cordless drill powered log splitter 100 can include a transmission 120 (aka "geared pump" or "transfer"). The transmission 120 is connected to the cylinder 114, actuating the cylinder 114 relative to the body 102. I.e., force in the transmission 120 is transmitted to the cylinder 114 which moves the c-bracket 116 and connected rods 118, frame 110 and the contact member 108, moving the contact member 108. The transmission 120 is connected to a cordless drill, as described below.

The transmission can include a drive shaft. A drive shaft is a component for transmitting mechanical power and torque and rotation. A drive shaft is used to connect components that cannot be connected directly because of distance or the need to allow for relative movement between them. I.e., the driveshaft is the portion of the transmission that carries the torque from the cordless drill to the cylinder 114. As torque carriers, drive shafts are subject to torsion and shear stress, equivalent to the difference between the input torque and the load. They must therefore be strong enough to bear the stress, while avoiding too much additional weight as that would in turn increase their inertia. The driveshaft can include one or more universal joints, jaw couplings, or rag joints, and sometimes a splined joint or prismatic joint.

FIG. 1 further shows that the cordless drill powered log splitter 100 can include a faceplate 122. The faceplate 122 prevents direct access to the transmission 120. I.e., the faceplate 122 helps seal off the transmission 120 while allowing power to be transmitted from the cordless drill to the transmission 120, as described below. This means that the transmission 120 cannot lose oil and is protected from dirt and debris buildup. This is critical to reduced maintenance and increased reliability. I.e., since there are not oil changes or other maintenance required portability and reliability is increased.

FIG. 1 additionally shows that the cordless drill powered log splitter 100 can include a foot 124. The foot 124 is configured to support the cordless drill and make connection between the cordless drill and the faceplate 122 easier. Further, the foot 124 adds stability, allowing the cordless drill powered log splitter 100 to be placed on a raised surface, such as a workbench or truck bed, during operation. Additionally, the foot 124 helps secure the cordless drill in place, as described below.

FIG. 1 additionally shows that the cordless drill powered log splitter 100 can include a switch 126. The switch 126 is a critical safety feature. In order to operate the cordless drill powered log splitter 100, the user needs to actuate the switch 126 and pull the trigger on the connected cordless drill. This two-handed operation ensures that the user cannot accidentally turn on the cordless drill powered log splitter 100, greatly reducing the chances for an accident.

FIG. 1 moreover shows that the cordless drill powered log splitter 100 can include a guard 128. The guard 128 prevents the user's hands from being near the contact member 108 during operation. I.e., the user's hands are on the cordless drill trigger and the switch 126 and the guard 128 prevents the user's hand on the switch from slipping and coming into contact with any moving parts. The guard 128 also prevents debris from a log which is being split from flying toward the user's hand which is operating the switch 126.

FIG. 1 also shows that the cordless drill powered log splitter 100 can include a pair of wheels 130. The wheels 130 allow ease of portability. I.e., the wheels 130 allow the cordless drill powered log splitter 100 to be easily moved to different work areas. The wheels 130 are large enough that the cordless drill powered log splitter 100 can be moved in outdoor areas.

FIG. 1 further shows that the cordless drill powered log splitter 100 can include a handle 132. The handle 132 is used for moving the drill powered log splitter 100. I.e., a user can lift the handle 132, which means the majority of the weight of the cordless drill powered log splitter 100 moves to the wheels 130. The cordless drill powered log splitter 100 can then be wheeled to the desired position and the handle 132 lowered until the cordless drill powered log splitter 100 rests on the ground. In addition, because the handle 132 is connected to the rails 104, the combination of the handle and the rails 104 can be used to lift the entirety of the cordless drill powered log splitter 100.

Figure 2:
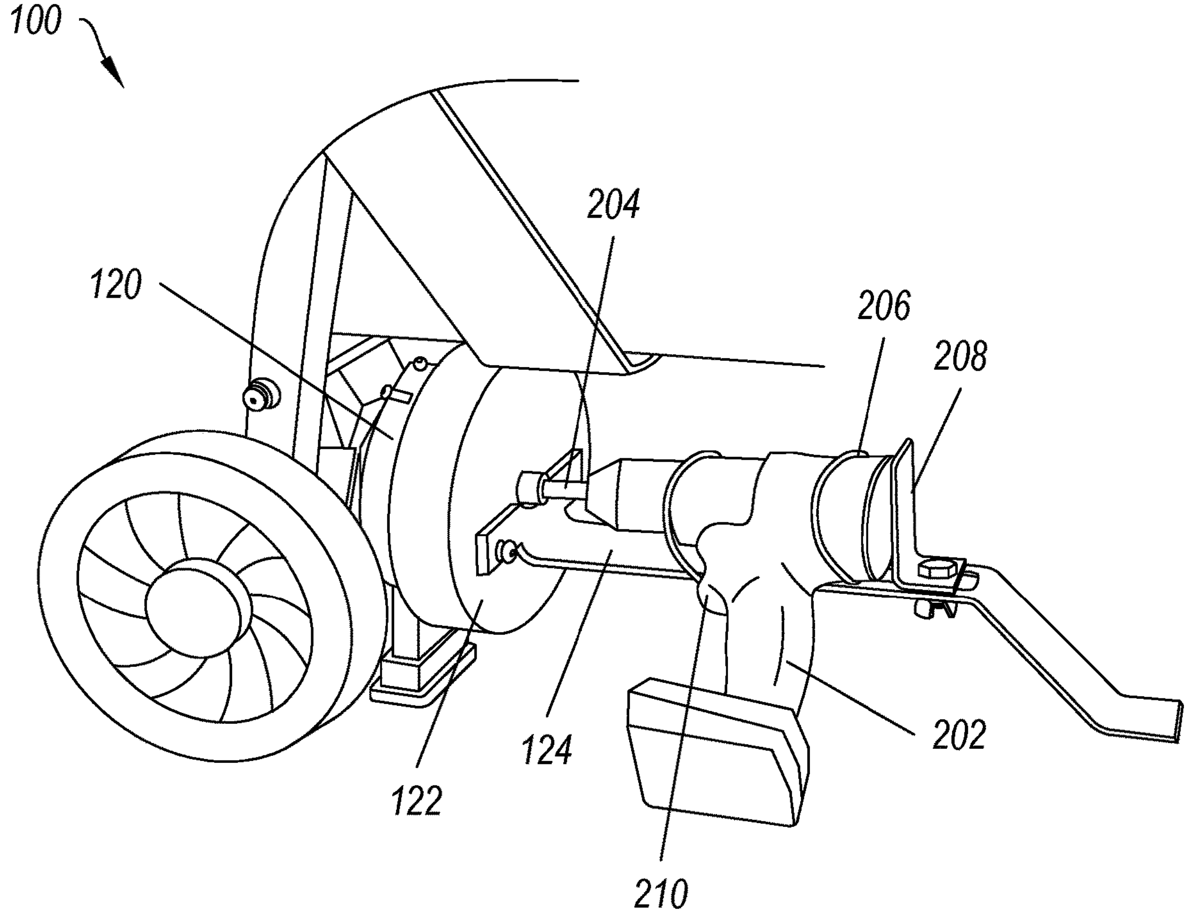
FIG. 2 illustrates a closeup view of a cordless drill connected to a cordless drill powered log splitter.

FIG. 2 illustrates a closeup view of a cordless drill 202 connected to a cordless drill powered log splitter 100. The cordless drill 202 is connected via the faceplate 122 and is secured in place on the foot 124. Cordless drills 202 are ubiquitous and are portable, compact and light. They are easy to operate and can have batteries changed easily. The cordless drill 202 has a motor that is driven by electricity to produce a rotary motion. This means that the cordless drill powered log splitter 100 does not need a dedicated motor.

FIG. 2 shows that the cordless drill 202 is connected to a shaft 204. The shaft 204 passes through the faceplate 122 into the transmission 120. Thus, any torque produced by the cordless drill 202 is transmitted to the shaft 204 and from there to the transmission 120, which ultimately results in force being applied to the contact member which pushes a log onto the splitting wedge. The shaft 204 passes through the faceplate 122 which means that the transmission 120 remains sealed, reducing wear and maintenance needs.

FIG. 2 also shows that cordless drill powered log splitter 100 can include an attachment 206. The attachment 206 secures the cordless drill 202 in place during operation. Specifically, the attachment 206 can ensure that the body of the cordless drill 202 rests on the foot 122 to reduce wobble and make it easy for an operator to keep the drill aligned with the shaft 204 while the motor of the cordless drill 202 is engaged. The attachment 206 can include any desired material, such as zip ties, cords, bungee cords or any other desired attachment mechanism. The attachment 206 can wrap around the foot 122 or can be otherwise secured to the foot 122.

FIG. 2 further shows that the cordless drill powered log splitter 100 can include a bracket 208. The bracket 208 keeps the cordless drill 202 engaged with the shaft 204. I.e., the cordless drill 202 cannot be pulled out of the shaft 204 because of the bracket 208. Thus, the attachment 206 and the bracket 208 work together to ensure that the user does not have to align the drill with the shaft 204 during operation. This allows the user to pull the trigger 210 of the cordless drill while holding the switch 126, increasing user safety.

Figure 3:
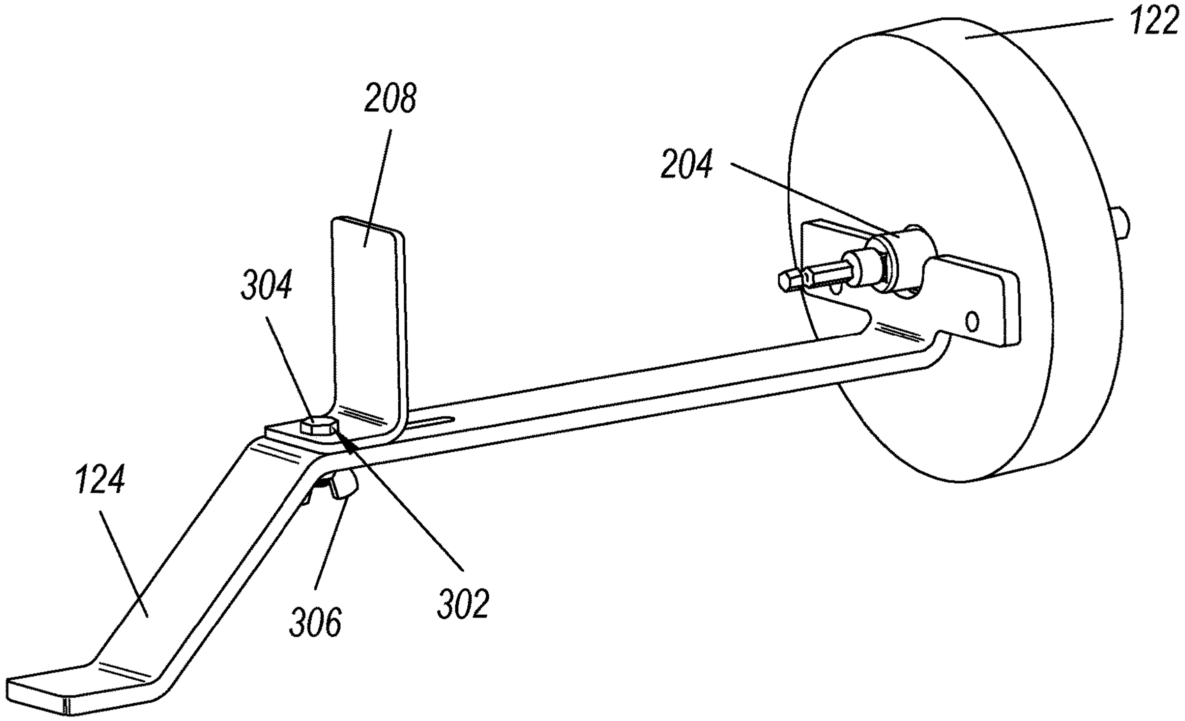
FIG. 3 illustrates an example of a foot and shaft connected to the faceplate.

FIG. 3 illustrates an example of a foot 124 and shaft 204 connected to the faceplate 122. The foot 124, shaft 204 and faceplate 122 are critical to allow for the cordless drill powered log splitter to be as portable as possible. This is for a number of reasons. First, the foot 124, shaft 204 and faceplate 122 dramatically reduce the weight of the cordless drill powered log splitter. In particular, the foot 124, shaft 204 and faceplate 122 eliminate the need for a motor, which is a large portion of the weight. It also eliminates the need for extension cords or other accessories.

Additionally, the foot 124, shaft 204 and faceplate 122 reduce the number of components under the body, which allows the cordless drill powered log splitter to be maneuvered in a number of different ways. For example, a bracket can be placed under the body 102, which is made possible by the absence of a motor and mounted to a hitch or other mechanical means for transporting the cordless drill powered log splitter. I.e., the cordless drill powered log splitter can be mounted to sit parallel to the tailgate of a truck for transport and can be used in place (i.e., it does not have to be removed from the bracket for use). Similar mounting can be done on other vehicles, such as an ATV, camper, etc. Likewise, the absence of a motor creates a "cavity" under the body 102 which allows the cordless drill powered log splitter to be placed on a user's shoulder to be walked to an area for use. This means that the cordless drill powered log splitter can be transported with ease or can be used in places such as workbenches with ease, giving a user maximum flexibility and portability.

FIG. 3 shows that the bracket 208 can be secured using a fastener 302. The fastener 302 can be loosened to allow the bracket 208 to move laterally along the foot 122. The fastener 302 can likewise be tightened when the bracket 208 is pushed against the back of the cordless drill to keep the cordless drill engaged with the shaft 204. I.e., loosening the fastener 302 and the attachment allows the cordless drill 202 to be disengaged from the cordless drill powered log splitter 100.

Exemplarily, FIG. 3 shows a bolt 304 and wingnut 306 as the fastener. It is critical that the fastener 302 be securable without tools. Toolless operation increases portability because it allows the cordless drill to be secured to the cordless drill powered log splitter 100 on site, which reduces the weight of the cordless drill powered log splitter. That is, the cordless drill is the motor for the cordless drill powered log splitter and the power source, which reduces weight and dramatically increases portability. This portability is hampered by requiring tools to secure the fastener 302.

Figure 4A:
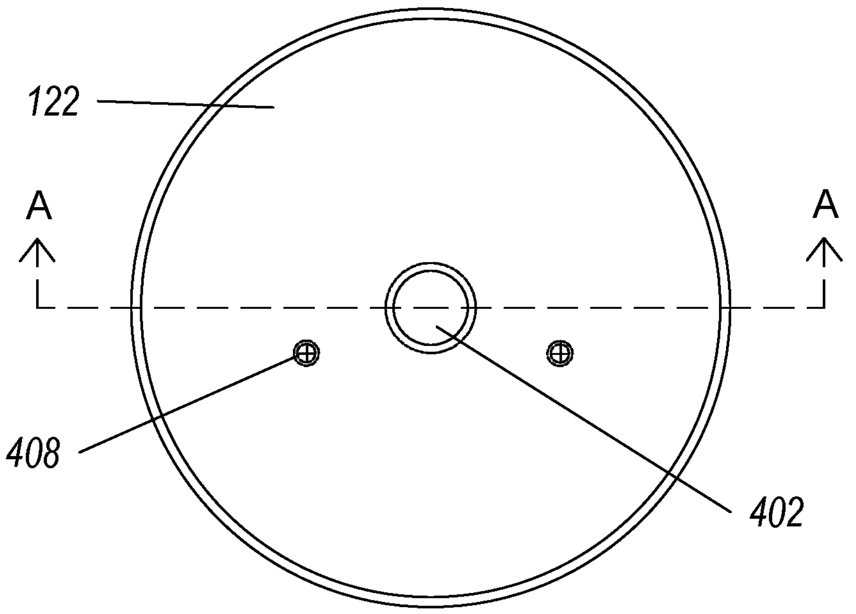
FIG. 4A illustrates a front view of the example of a faceplate.
Figure 4B:
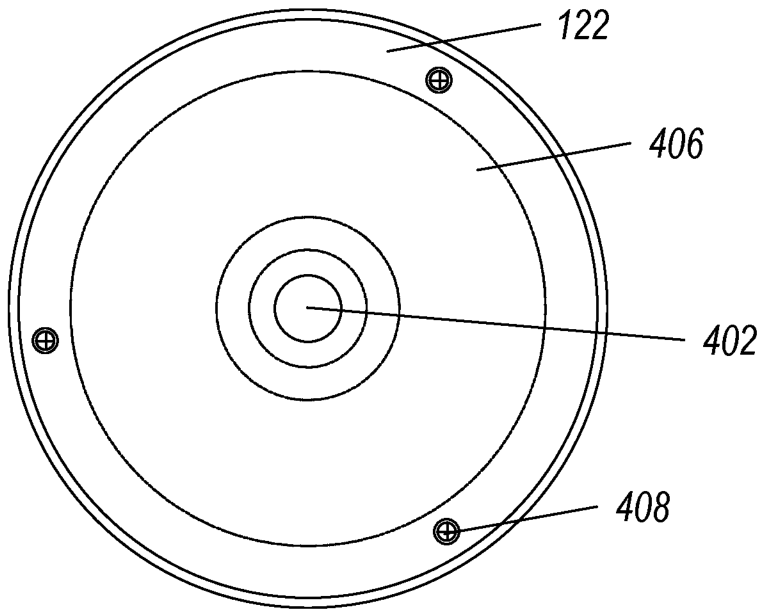
FIG. 4B illustrates a rear view of the example of a faceplate.
Figure 4C:
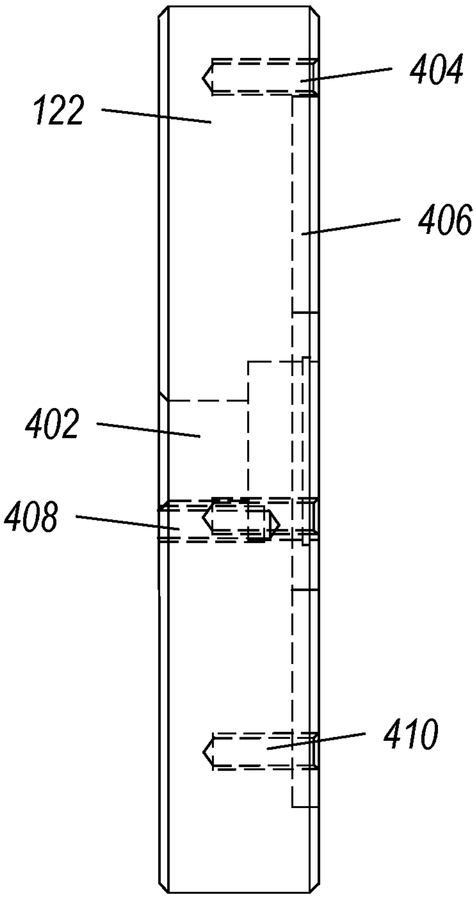
FIG. 4C illustrates a side view of the example of a faceplate with internal portions shown in dashed lines.
Figure 4D:
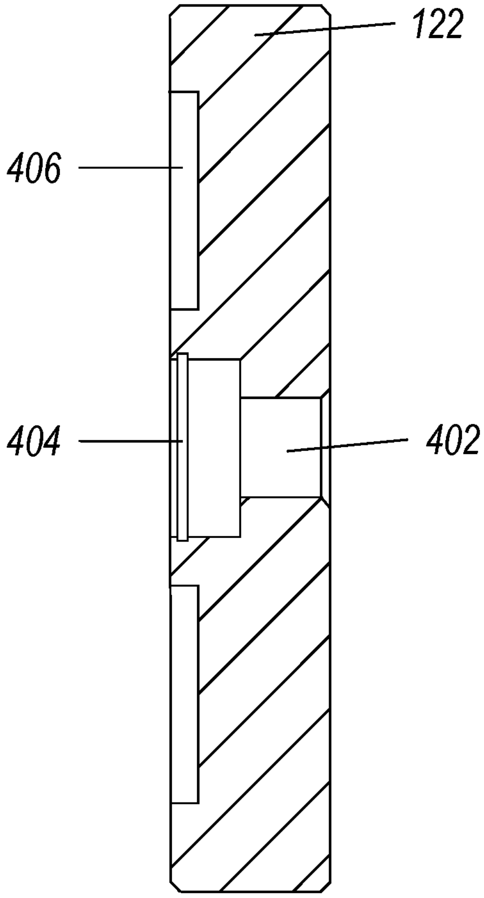
FIG. 4D illustrates a cut-away view of the example of a faceplate along line A-A of FIG. 4A.
Figure 4E:
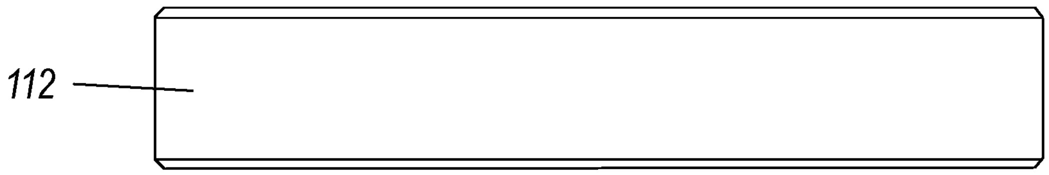
FIG. 4E illustrates a side view of the example of a faceplate.
Figure 4F:
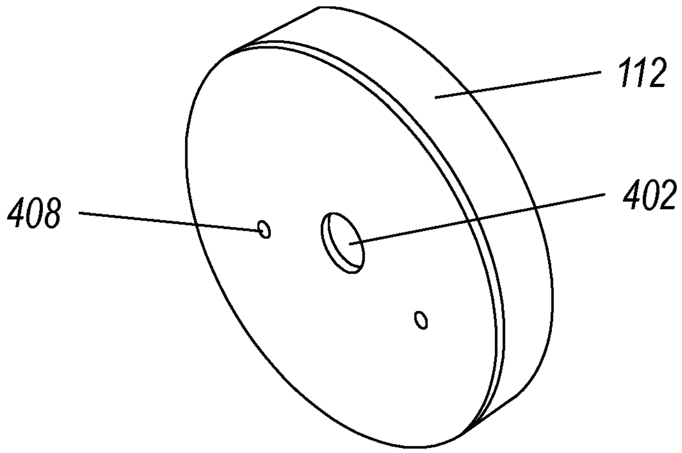
FIG. 4F illustrates a front left top isometric view of the example of a faceplate.
Figure 4G:
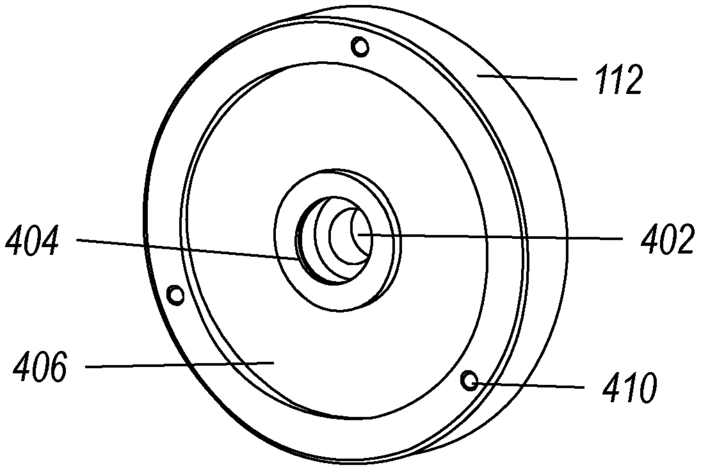
FIG. 4G illustrates a rear right top isometric view of the example of a faceplate.

FIGS. 4A-4G (collectively "FIG. 4") illustrates an example of a faceplate 122. FIG. 4A illustrates a front view of the example of a faceplate 122; FIG. 4B illustrates a rear view of the example of a faceplate 122; FIG. 4C illustrates a side view of the example of a faceplate 122 with internal portions shown in dashed lines; FIG. 4D illustrates a cutaway view of the example of a faceplate 122 along line A-A of FIG. 4A; FIG. 4E illustrates a side view of the example of a faceplate 122; FIG. 4F illustrates a front left top isometric view of the example of a faceplate 122; and FIG. 4G illustrates a rear right top isometric view of the example of a faceplate 122. The faceplate 122 is critical to allow power transmission to the transmission of the cordless drill powered log splitter while sealing off the transmission. This reduces maintenance and prolongs usability.

FIG. 4 shows that the faceplate 122 can include an aperture 402. The aperture 402 allows the shaft to pass through the faceplate 122. The shaft is sealed within the aperture 402. This prevents leakage of hydraulic fluid from the transmission. I.e., the shaft within the aperture 402 and the faceplate together form a leak proof surface, through which hydraulic fluid cannot pass so that all hydraulic fluid is retained within the transmission. However, the shaft can turn within the aperture 402. This allows the torque provided a portable drill to pass through the faceplate to the transmission.

The seal between the shaft and the aperture 402 can include any desired sealing mechanism. For example, the seal can be created by an O-ring. The O-ring is placed around the shaft within the aperture 402 in groove 404 so that it can turn within the aperture 402. I.e., the shaft is not in direct contact with the walls of the aperture 402, instead it is in contact with an O-ring which is in contact with the groove 404 in the aperture 402. An O-ring, also known as a packing or a toric joint, is a mechanical gasket in the shape of a torus; it is a loop of elastomer with a round cross-section, designed to be seated in a groove and compressed during assembly between two or more parts, forming a seal at the interface.

Likewise, there is a seal between the faceplate 122 and an attached transmission. This can include a rubber seal, such as an O-ring, or any other desired seal placed in groove 406. This prevents hydraulic fluid from leaving the transmission.

I.e., it allows the faceplate 122 to seal the hydraulic fluid within the transmission, lowering maintenance costs and increasing reliability.

FIG. 4 also shows that the faceplate 122 can include one or more screw holes 408. The screw holes 408 allow the foot to be attached to the faceplate 122 in the correct alignment. I.e., the screw holes 408 are positioned such that the foot will be in the optimal place for attachment of the cordless drill to the shaft when the cordless drill is placed on the foot.

The screw holes 408 create an alignment between the cordless drill and the shaft, such that the cordless drill can be attached in line with the shaft. I.e., the screw holes 408 ensure that the body of the foot is approximately 1¼ inches below the center of the aperture 402. This drop ensures that cordless drills can be attached to the foot in an alignment where the shaft is easily inserted into the chuck of the cordless drill. As used in the specification and the claims, the term approximately shall mean that the value is within 10% of the stated value, unless otherwise specified.

FIG. 4 further shows that the faceplate 122 can include one or more screw holes 410. The one or more screw holes 410 are used to secure the faceplate 122 to the transmission. I.e., a bolt can pass through the housing of the transmission into the screw holes 410. As the bolts are tightened they pull the faceplate securely against the transmission creating a seal between the faceplate 122 and the transmission (because of the rubber seal located in the groove 406 discussed above).

The faceplate 112 is a balance between keeping weight low (to increase portability) and being strong (to resist the pressure created in the hydraulic fluid and support the weight of the foot and drill). In order to achieve this balance, the faceplate is made of a lightweight but strong material such as steel or high strength aluminum.

Figure 5A:
FIG. 5A illustrates a side view of the example of a foot.
Figure 5B:
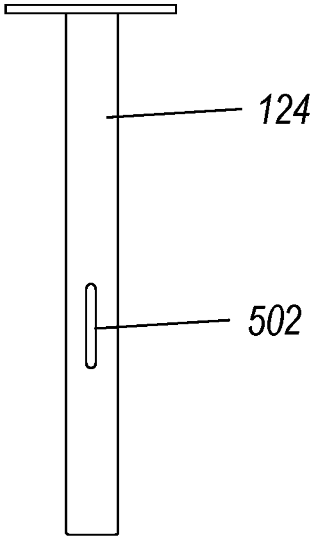
FIG. 5B illustrates a top view of the example of a foot.
Figure 5C:
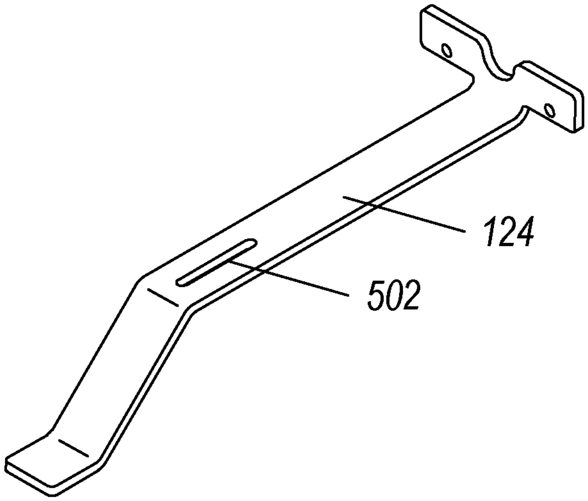
FIG. 5C illustrates an isometric view of the example of a foot.

FIGS. 5A-5C (collectively "FIG. 5") illustrate an example of a foot 124. FIG. 5A illustrates a side view of the example of a foot 124; FIG. 5B illustrates a top view of the example of a foot 124; and FIG. 5C illustrates an isometric view of the example of a foot 124. The foot 124 supports the cordless drill during operation and ensures that the cordless drill remains in place relative to the shaft and faceplate.

Experimentation showed that the placement and design of the foot 124 were critical to proper operation. Without a foot 124 alignment of the cordless drill is much more difficult. This is both because the cordless drill moves freely relative to the shaft and because the user had to pick up and place the cordless drill each time which was not efficient and took more time to align.

In addition, after the foot 124 was originally designed, problems were still observed. In particular, with the original foot 124 and attachment, over time the straps would loosen, and the drill would not be secure interrupting operation, creating a need to add the bracket to keep engagement between the cordless drill and the shaft. Addition of the bracket showed that it needed to be adjustable in order to allow for different cordless drills. This led to the development of the slot 502 and the fastener which created adjustability.

Figure 6A:
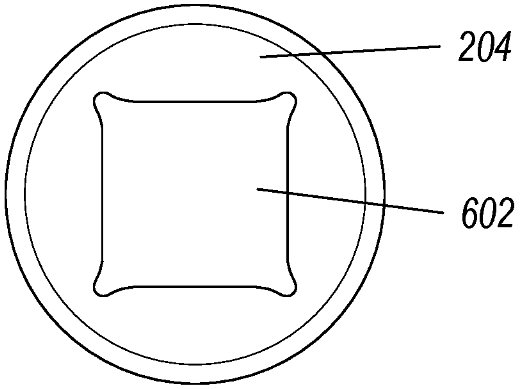
FIG. 6A illustrates a front view of the example of a shaft.
Figure 6B:
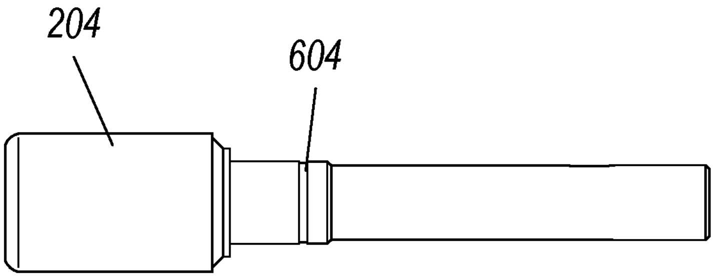
FIG. 6B illustrates a left-side view of the example of a shaft.
Figure 6C:
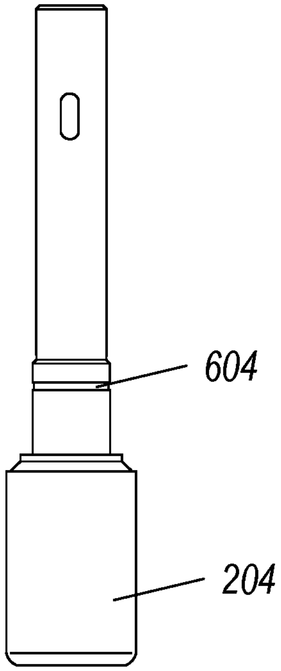
FIG. 6C illustrates a top view of the example of a shaft.
Figure 6D:
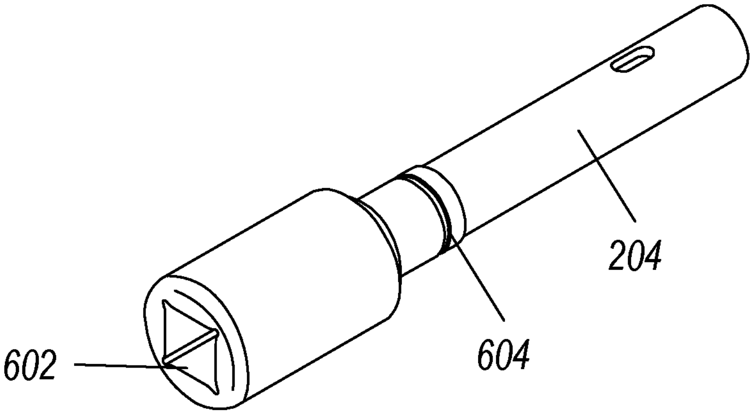
FIG. 6D illustrates an isometric view of the example of a shaft.

FIGS. 6A-6D (collectively "FIG. 6") illustrate an example of a shaft 204. FIG. 6A illustrates a front view of the example of a shaft 204; FIG. 6B illustrates a left-side view of the example of a shaft 204; FIG. 6C illustrates a top view of the example of a shaft 204; and FIG. 6D illustrates an isometric view of the example of a shaft 204. The shaft 204 allows torque to pass through the faceplate into the transmission while retaining hydraulic fluid.

FIG. 6 shows that the shaft 204 includes a square female socket 602. Experimentation with a hex socket showed that the socket wore over time causing slippage. A square female socket 602 reduces wear and prolongs the life of the shaft 204.

FIG. 6 also shows that the shaft 204 includes a groove 604. The groove 604 allows for placement of an O-ring, which can be used to create a seal between the shaft 204 and the faceplate. I.e., the groove 604 ensures the correct placement and retention of an O-ring.

Figure 7:
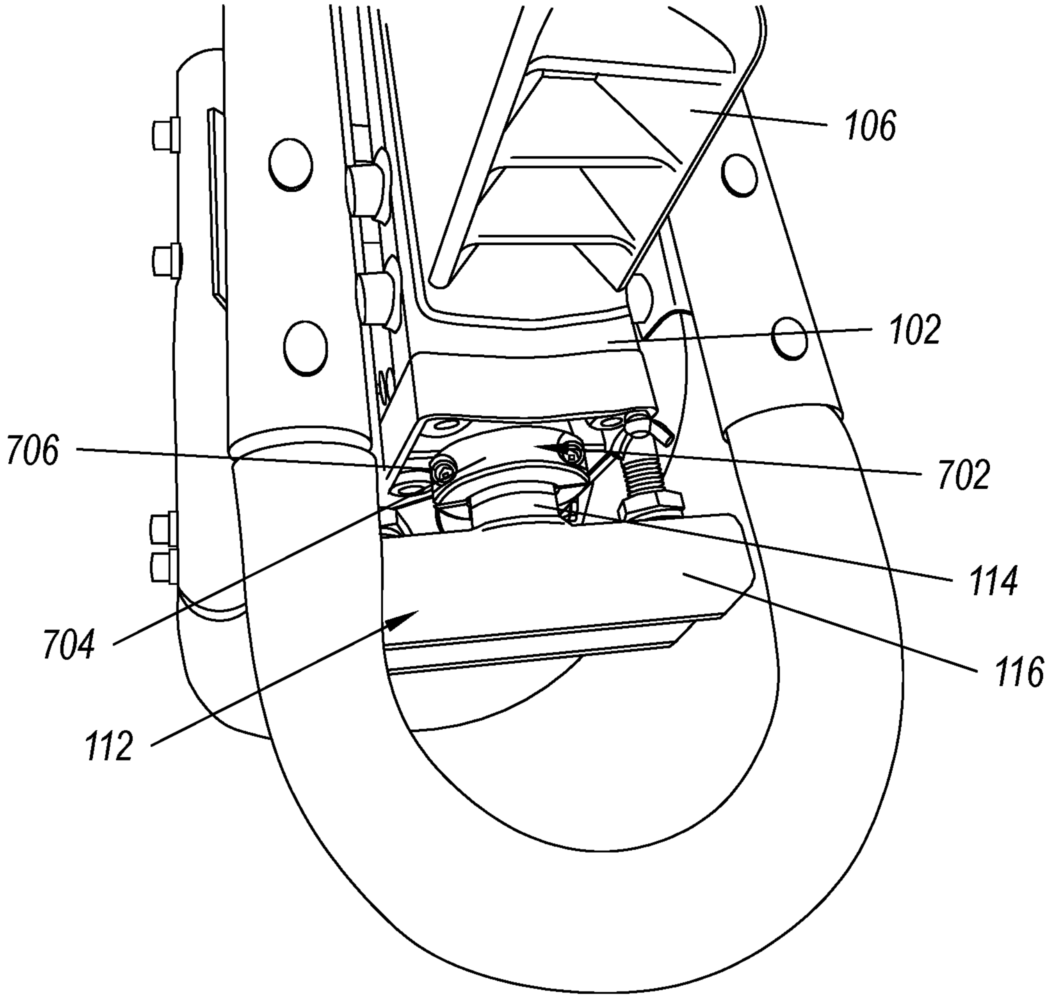
FIG. 7 illustrates an example of a stop.

FIG. 7 illustrates an example of a stop 702. The stop 702 reduces the distance between the contact member and the splitting wedge 106. A reduced distance between the contact member and the splitting wedge 106 reduces the time needed to split logs and the energy used in any single splitting operation. I.e., reducing the distance between the contact member and the splitting wedge 106 means that the guide assembly 112 has to move less in any splitting operation which means that more log splits can be accomplished on a single battery for the cordless drill. Without the stop 702 the splitting operation is much slower and far less efficient as a portion of the battery life is used to move through empty space. Additionally, the lack of a stop 702 creates a danger to the user as he/she may need to place the log in the middle of a splitting operation (i.e., the user may have to engage the switch and the cordless drill, move the contact member to the correct position, place the log, then resume the splitting operation).

FIG. 7 shows that the stop 702 can include a shaft collar 704 on the cylinder 114. The shaft collar 704 serves as a mechanical stop and stroke limiter. I.e., the shaft collar 704 can prevent the cylinder 114 from being fully retracted into the body 102. That is, a user can perform a splitting operation and before the cylinder 114 is retracted, set the shaft collar 704 on the cylinder to shorten the stroke length of the cylinder 114. Then each stroke covers a shorter distance.

FIG. 7 also shows that the stop 702 can include a fastener 706. The fastener 706 can include a screw or bolt that tightens the shaft collar 704 around the cylinder 114. For example the fastener 706 can include a set screw which bites into the cylinder 114 when tightened, holding the shaft collar 704 in place. Alternatively, the fastener 706 can include a single screw with either a hinge or slot opposite the screw which allows the shaft collar 704 to open to release pressure on the shaft collar 704, allowing it to move freely along the cylinder 114. The single screw may or may not be fully removable from the shaft collar 704. Conversely, the fastener 706 can include a pair of screws that hold to independent pieces of the shaft collar 704 to one another. A pair of screws allows the shaft collar 704 to be more easily removed from the cylinder 114. I.e., a pair of screws allows the shaft collar 704 to be placed without access to the end of the cylinder 114 (which is attached to the c-bracket 116).

Figure 8:
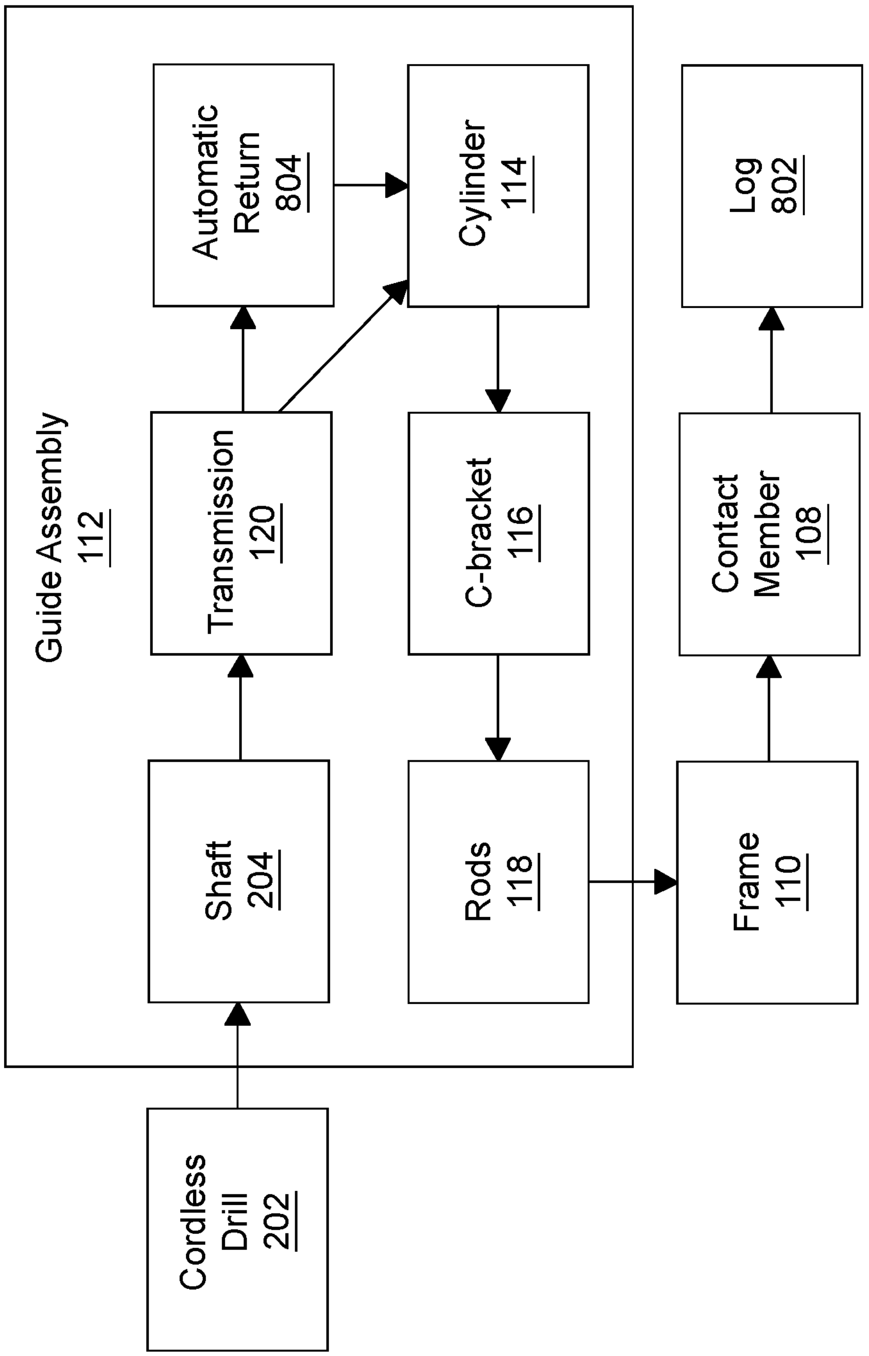
FIG. 8 is a block diagram that illustrates an example of power being transmitted from a cordless drill to a log through a guide assembly.

FIG. 8 is a block diagram that illustrates an example of power being transmitted from a cordless drill 202 to a log 802 through a guide assembly 112. Ultimately, the power provided by the cordless drill 202 has to be used to move a log 802 onto a splitting wedge, or vice versa, for the log to be split. The more efficient the power transfer process, the more logs that can be split before the battery needs to be changed.

FIG. 8 shows that the power from the cordless drill 202 is transmitted to the guide assembly 112. This is done by a direct connection between the cordless drill 202 and the shaft 204 which passes through the faceplate into the transmission 120. In turn the transmission moves the cylinder 114 relative to the body of the cordless drill powered log splitter and some of the power is passed into an automatic return 804.

The automatic return 804 will return the cylinder 114 to its "home position" (which is set by the position of the stop as discussed above) without using power from the cordless drill for the return operation. I.e., the automatic return stores some of the power transmitted during the splitting operation and uses that stored power to return the cylinder 114 to its home position. This can be accomplished using any mechanism which can store mechanical power. For example, the automatic return 804 can include a spring which is stretched during the splitting operation. When the cylinder 114 is no longer being extruded, the spring can pull the cylinder 114 back into the body of the cordless drill powered log splitter.

FIG. 8 also shows that the extrusion of the cylinder 114 moves the c-bracket 116. The c-bracket 116 pulls on the attached rods 118 which are also attached to the frame 110. The frame 110 is attached to the contact member 108 and moves longitudinally along the body. The contact member 108 then presses the log 802 against a slitting wedge, cause the log 802 to split.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cordless drill powered log splitter, the cordless drill powered log splitter comprising:
- a body;
- one or more rails, the one or more rails configured to support a piece of wood during a splitting operation;
- a splitting wedge mounted on the body;
- a contact member, the contact member configured to press the piece of wood against the splitting wedge during the splitting operation;
- a transmission, the transmission configured to:
  - move the contact member relative to the body; and
  - connect to a cordless drill, wherein the cordless drill provides the power to the transmission; and
- a foot, wherein the foot is configured to support the cordless drill during operation.

2. The cordless drill powered log splitter of claim 1 further comprising one or more wheels, wherein the one or more wheels:
- are connected to the body; and
- configured to support the weight of the cordless drill powered log splitter.

3. The cordless drill powered log splitter of claim 1 further comprising a guard, the guard configured to prevent the user's hands from being near the splitting wedge during operation.

4. The cordless drill powered log splitter of claim 1, wherein the body is a hollow rectangular cylinder.

5. The cordless drill powered log splitter of claim 4, wherein the one or more rails are parallel to a main axis of the body.

6. The cordless drill powered log splitter of claim 1, wherein the one or more rails includes tubular steel.

7. The cordless drill powered log splitter of claim 1, wherein the contact member includes a plate configured to press on a log.

8. The cordless drill powered log splitter of claim 1, wherein the one or more rails includes a pair of rails.

9. A cordless drill powered log splitter, the cordless drill powered log splitter comprising:
- a body;
- one or more rails, the one or more rails configured to support a piece of wood during a splitting operation;
- a splitting wedge mounted on the body;
- a contact member, the contact member configured to press the piece of wood against the splitting wedge during the splitting operation;
- a transmission, the transmission configured to:
  - move the contact member relative to the body; and
  - connect to a cordless drill, wherein the cordless drill provides the power to the transmission;
- a faceplate, wherein the faceplate seals the transmission;
- a shaft, wherein the shaft:
  - passes through the faceplate; and
  - is configured to connect to a cordless drill; and
- a foot, wherein the foot is configured to support the cordless drill during operation.

10. The cordless drill powered log splitter of claim 9, wherein the foot includes a bracket, the bracket configured to keep the cordless drill engaged with the shaft.

11. The cordless drill powered log splitter of claim 10 further comprising a fastener, wherein the fastener is configured to prevent movement of the bracket relative to the foot.

12. The cordless drill powered log splitter of claim 11, wherein the fastener is toolless.

13. The cordless drill powered log splitter of claim 12, wherein the fastener includes a bolt and a wingnut.

14. A cordless drill powered log splitter, the cordless drill powered log splitter comprising:
- a body;
- one or more rails, the one or more rails:
  - attached to the body; and
  - configured to support a piece of wood during a splitting operation;
- a splitting wedge mounted on the body;
- a contact member, the contact member configured to press the piece of wood against the splitting wedge during the splitting operation;
- a frame, wherein the frame is configured to connect the contact member to the body;
- a guide assembly, wherein the guide assembly includes:
  - a cylinder, the cylinder disposed at least partially within the body;
  - a c-bracket, the c-bracket connect to the cylinder;
  - one or more rods, wherein the one or more rods are:
    - connected to the c-bracket at a first end; and
    - connected to the frame at a second end;
- a transmission, the transmission configured to move the cylinder relative to the body; and
- a faceplate, wherein the faceplate seals the transmission;
- a shaft, wherein the shaft:
  - passes through the faceplate; and
  - is configured to connect to a cordless drill; and
- a foot, wherein the foot is configured to support the cordless drill during operation; and
- a switch, wherein the switch must be actuated in order for the contact member to move relative to the body;
- a stop, wherein the stop allows the user to set the initial distance between the contact member and the splitting wedge; and a return, wherein the return automatically returns the contact member to its original position after the splitting operation.

15. The cordless drill powered log splitter of claim 14, wherein the return includes a spring.

16. The cordless drill powered log splitter of claim 14, wherein the one or more rods includes a pair of rods.

17. The cordless drill powered log splitter of claim 14, the frame is placed around the body.

18. The cordless drill powered log splitter of claim 14, wherein the cylinder is hydraulically driven.

19. The cordless drill powered log splitter of claim 14, wherein the transmission includes a drive shaft.

20. The cordless drill powered log splitter of claim 14 wherein the one or more rails create a framework which is configured to allow a user to pick up the cordless drill powered log splitter.

* * * * *